(12) United States Patent
Hsu et al.

(10) Patent No.: US 6,643,221 B1
(45) Date of Patent: Nov. 4, 2003

(54) STRUCTURES AND METHODS FOR DAMPING TOOL WAVES PARTICULARLY FOR ACOUSTIC LOGGING TOOLS

(75) Inventors: Chaur-Jian Hsu, Danbury, CT (US); Jahir A. Pabon, Brookfield, CT (US); Richard D. Joyce, Brookfield, CT (US); Ralph M. D'Angelo, New Fairfield, CT (US); Jeffrey B. Aron, Houston, TX (US); Pierre Campanac, Sugar Land, TX (US); Lennox Reid, Houston, TX (US); H. Charles Straub, Sugar Land, TX (US); Cengiz Esmersoy, Sugar Land, TX (US); Darryl Grigor, Bangkok (TH)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/992,761

(22) Filed: Nov. 6, 2001

(51) Int. Cl.[7] .............................. G01V 1/40; E21B 17/10
(52) U.S. Cl. ...................... 367/162; 367/81; 367/177; 367/911; 175/50; 166/249; 181/102
(58) Field of Search .......................... 367/25, 81, 162, 367/177, 911; 175/50; 166/249, 254.2; 181/102, 207

(56) References Cited

U.S. PATENT DOCUMENTS

| | | | | |
|---|---|---|---|---|
| 1,294,467 A | * | 2/1919 | Hovas ........................ | 175/50 |
| 2,396,935 A | * | 3/1946 | Walstrom ................... | 181/207 |
| 2,984,453 A | * | 3/1961 | Heymann ................... | 175/50 |
| 3,191,141 A | * | 6/1965 | Schuster | |
| 3,794,976 A | * | 2/1974 | Mickler | |
| 3,991,850 A | * | 11/1976 | Escaron ...................... | 181/102 |
| 4,744,604 A | * | 5/1988 | Lewis et al. ................. | 299/10 |
| 5,365,842 A | * | 11/1994 | Panossian ................... | 101/216 |
| 5,425,067 A | * | 6/1995 | Sano et al. .................. | 378/125 |
| 5,454,562 A | * | 10/1995 | Sommer ...................... | 273/73 |
| 5,510,582 A | * | 4/1996 | Birchak et al. ............. | 181/102 |
| 5,644,186 A | | 7/1997 | Birchak et al. | |
| 5,796,677 A | | 8/1998 | Kostek et al. | |
| 5,852,262 A | | 12/1998 | Gill et al. | |
| 5,852,587 A | * | 12/1998 | Kostek et al. ............... | 367/25 |
| 5,936,913 A | | 8/1999 | Gill et al. | |
| 6,082,484 A | * | 7/2000 | Molz et al. .................. | 181/102 |

FOREIGN PATENT DOCUMENTS

EP 0388316 A2 9/1990

OTHER PUBLICATIONS

Search Report for GB 0224621.3 dated Feb. 17, 2003.

* cited by examiner

*Primary Examiner*—Nelson Moskowitz
(74) *Attorney, Agent, or Firm*—Victor H. Segura; Brigitte L. Jeffery; John Ryberg

(57) ABSTRACT

In one aspect, the invention involves an acoustic logging tool for performing acoustic investigations of subsurface geological formations. In one embodiment, the tool comprises a generally longitudinally extending tool body adapted for positioning in a borehole. At least one transmitter is mounted on the tool body to emit acoustic energy. At least one receiver is also mounted on the tool body at a location axially displaced from the at least one transmitter. The receiver is adapted to receive acoustic energy. An attenuator is also positioned along the body and includes at least one cavity having a plurality of particles disposed therein. The attenuator as disclosed herein may be applied to other logging tools for protecting tool components and enhancing measurement quality. Methods for attenuating acoustic energy transmitted through the body of an acoustic logging tool or other logging tools are also disclosed.

40 Claims, 13 Drawing Sheets

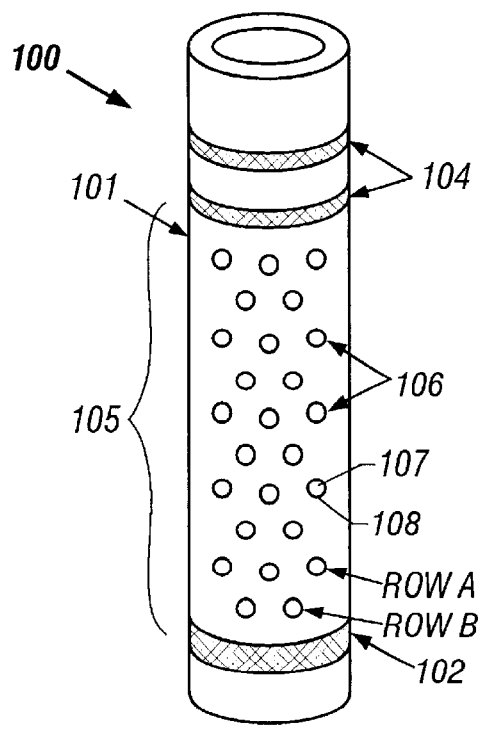
FIG. 1A
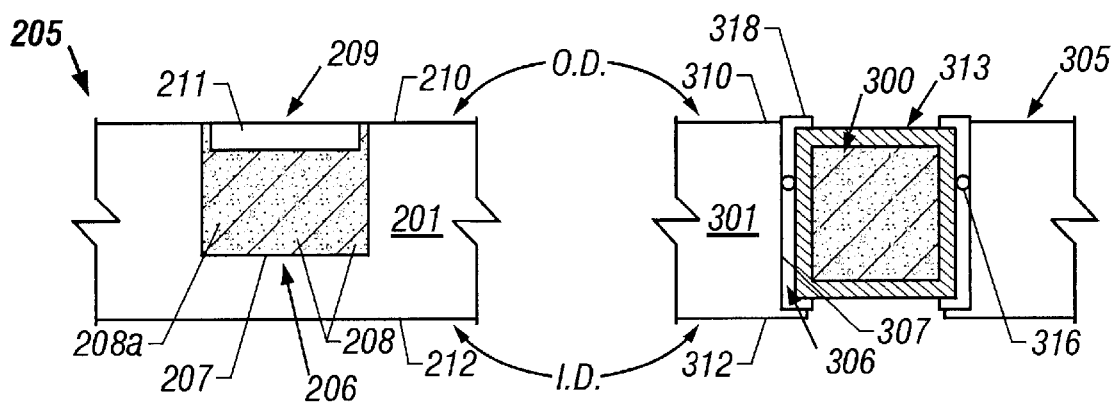
FIG. 2  FIG. 3

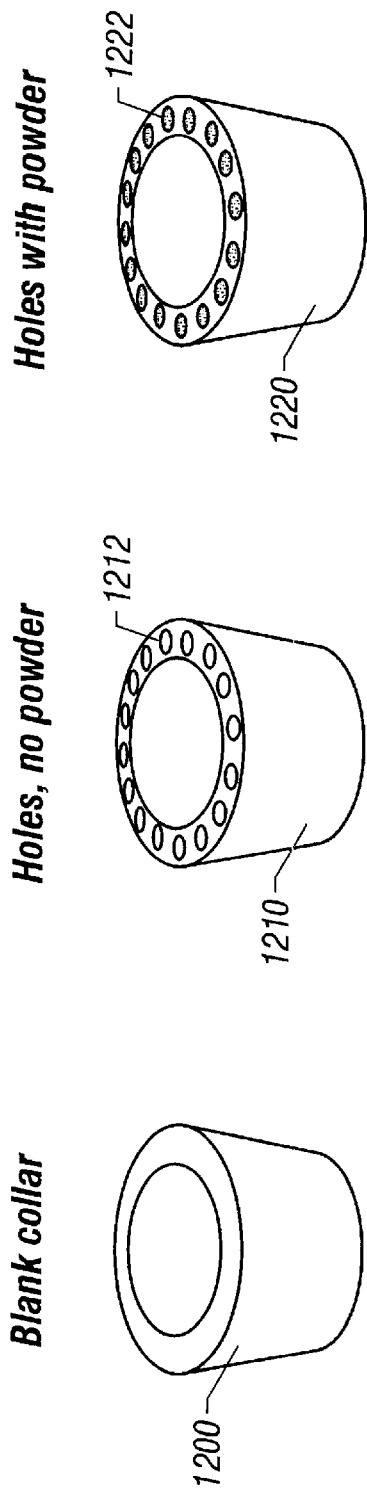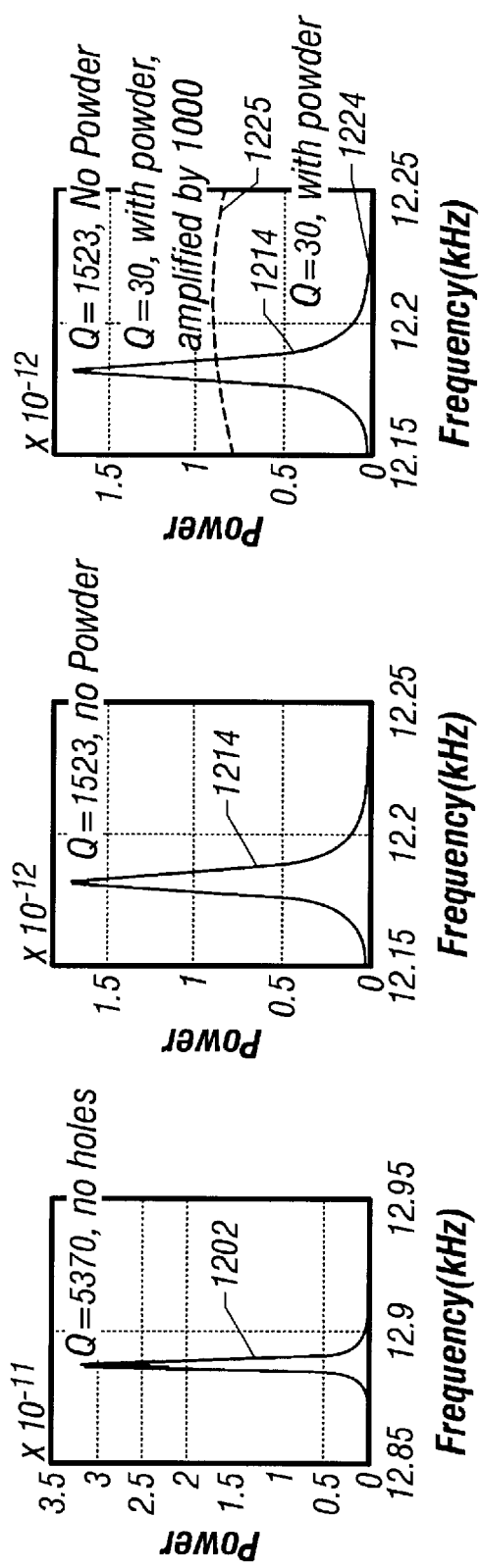
FIG. 12A  FIG. 12B  FIG. 12C

STRUCTURES AND METHODS FOR DAMPING TOOL WAVES PARTICULARLY FOR ACOUSTIC LOGGING TOOLS

FIELD OF THE INVENTION

The present invention relates to acoustic logging tools for performing acoustic investigations of subsurface geological formations traversed by a borehole. More particularly, the invention relates to the implementation of particle damping in well logging tools to attenuate tool waves.

BACKGROUND OF THE INVENTION

In the oil and gas industry, subsurface formations are typically probed by well logging tools to determine formation characteristics which can be used to predict or assess the profitability and producibility of subsequent drilling or production operations. In many cases, acoustic logging tools are used to measure formation acoustic properties which may be used to produce images or derive related characteristics for the formations.

Acoustic waves are periodic vibrational disturbances resulting from acoustic energy which propagates through a medium, such as a formation or logging tool. Acoustic waves are typically characterized in terms of their frequency, amplitude, and speed of propagation. Acoustic properties of interest for formations may include compressional (P) wave speed, shear (S) wave speed, and borehole modes, such as tube wave. Additionally, acoustic images may be used to depict borehole wall conditions and other geological features away from the borehole. These acoustic measurements have applications in seismic correlation, petrophysics, rock mechanics and other areas.

Recordings of acoustic properties as functions of depth are known as acoustic logs. Information obtained from acoustic logs may be useful in a variety of applications, including well to well correlation, determining porosity, determining mechanical or elastic parameters of rock to give an indication of lithology, detecting over-pressured formation zones, and enabling the conversion of a seismic time trace to a depth trace based on the measured speed of sound in the formation.

An acoustic logging tool typically includes one or more acoustic sources (i.e., a transmitter) for emitting acoustical energy into subsurface formations and one or more acoustic receivers for receiving acoustic energy. The receivers are typically axially spaced apart from the transmitters to allow the acoustic energy to propagating through the surrounding formation before being received at the receivers.

Transmitters and receivers for acoustic logging tools commonly comprise acoustic transducer elements, such as piezoelectric crystals. In general, an acoustic transducer converts energy between electric and acoustic forms and can be adapted to act as a source or a receiver. Acoustic transducers are typically mounted on the body of the logging tool. It is desired that the minimum amount of energy from the transmitter be transferred to the tool body and the maximum amount of energy be radiated into the borehole and the formation.

Acoustic energy emitted from a logging tool in a borehole may travel along multiple paths to reach the receivers. The part of the acoustic energy that propagates through the formation and fluid in the well is the energy that provides useful information for characterizing the formation. The part of the acoustic energy that propagates through the tool body generally provides no useful information about the formation and often presents a difficulty in measuring acoustic information from the formation.

A common issue for all acoustic tools is the part of the acoustic energy propagating along the tool body, referred to as a "tool wave." Tool wave is undesired because it contains substantially no information about the formation and interferes with the part of the acoustic energy propagating through the formation, referred to as the "formation wave." For many wireline tools, unwanted tool wave is reduced with design features such as slotted sleeves, isolation joints and flexible tool bodies. For logging while drilling (LWD) tools, tool waves are an even more serious challenge because these waves are carried by the prominent and stiff tool body, which is essentially a drill collar.

Various forms of acoustical energy propagating in the borehole can be used for probing different properties of the surrounding formation. For example, a monopole logging tool (wireline or logging while drilling type) uses single or multiple monopole acoustic source(s) as well as receivers which oscillate and detect uniformly in all azimuthal directions in the plane perpendicular to the tool axis.

It is well understood based on theory of wave propagation that a monopole tool can excite and detect P-waves and Stoneley waves in substantially all formations, regardless of formation acoustic speed. In addition, a monopole tool is capable of generating and detecting S-waves in so called "fast" formations where the formation shear speed is faster than the sound speed in the borehole fluid—drilling mud. However, part of the energy emitted by the monopole source couples to the tool body and generates tool waves. This tool wave propagates at a speed of about 5000 m/sec for low frequencies in a steel mandrel and typically arrives at the receivers before almost all the desirable signals from the surrounding formation. As a result, this tool wave arrival interferes with the desired formation wave signals, especially the formation P-wave.

For wireline monopole tools, the tool waves are usually delayed and suppressed by techniques such as slotted receiver housings. In logging while drilling monopole tools, which require thicker and stronger tool bodies, suppressing tool waves has proven to be a more difficult issue. One logging while drilling monopole tool operated under the trademark ISONIC by Schlumberger Technology Corporation of Sugar Land, Tex., achieves tool wave attenuation over a selected frequency band with a specially designed periodic array of grooves machined on the collar section between the transmitter and receivers, as described in U.S. Pat. No. 5,852,587 to Kostek et al.

As another example, a wireline dipole tool generates and receives flexural mode waves in a borehole. The term dipole refers to the azimuthal profile cosθ for the transmitter, receivers and the acoustic field associated with the flexural mode. The flexural mode propagation speed asymptotes to the formation shear speed at the low frequencies, and to the mud-formation interface wave speed at high frequencies. Thus S-wave speed of the formation can be derived from the measured flexural mode as discussed in "Acoustic multipole sources in fluid-filled boreholes" by Kurkjian and Chang in *Geophysics*, 51, 148–163 (1986).

To avoid or minimize tool wave effects on the measured borehole flexural mode, wireline dipole tools commonly use acoustically slow (i.e., mechanically flexible) housings for receivers. These tools may also include a form of acoustic isolator or attenuator between the source and receivers to reduce the transmission of tool waves.

Applying the wireline dipole shear technique to LWD tools is difficult. First, LWD tools cannot be made very flexible or acoustically slow, as done for wireline tools, because the tool body of an LWD tool is, in most cases, essentially a drill collar. This provides an easy propagation path for acoustic energy between the acoustic source and the receivers. The tool wave interferes with the borehole flexural wave and makes the measurement much more complicated and difficult, as discussed in "Mandrel effects on the dipole flexural mode in a borehole" by Hsu and Sinha in *Journal of the Acoustical Society of America*, 104(4), 2025–2039 (1998) and "Acoustics of fluid-filled boreholes with pipe: Guided propagation and radiation" by Rao and Vandiver in *Journal of the Acoustical Society of America*, 105, 3057–3066 (1999).

Additionally, in some cases acoustical energy reflected from formation or tool discontinuities above and below the acoustic transmitter and receivers, and acoustical energy coupled from the surrounding formation back to the tool may interfere with measurement quality or affect tool durability.

Several approaches for reducing tool waves have been proposed. For example, U.S. Pat. No. 5,510,582 disclosed the idea of attenuation by using a thin layer of viscous fluid in between an inertia mass and a cavity in the tool body. The relative motion between the tool and the inertia mass results in viscous dissipation in the fluid. U.S. Pat. No. 6,082,484 disclosed the concept of employing fluid-filled cavities on the tool body with the cavity resonance frequency designed within the frequency band of interest. U.S. Pat. No. 5,936,913 disclosed removing tool waves by providing a compensating sensor for detecting tool vibrations and for producing signals, which are combined with waveform data.

In a quest for attenuating these interfering tool waves, new techniques may be considered and adapted for use in downhole tool environments. One passive technique that has been used to reduce structural vibration is discussed in *Vibration Damping*, by Nashif, Jones, and Henderson (Wiley-Interscience, 1985). This technique involves the dissipation of energy through the shearing of a thin layer of viscoelastic material between a structure's surface and a thin constraining shell and, thus, is known as the "constraint layer" technique. However, the availability of a suitable viscoelastic material for the downhole temperature range is a major challenge.

Another method for structural damping is particle damping. Particle damping is a method for structural damping involving the use of particle-filled enclosures as part of the structure, as disclosed in U.S. Pat. No. 5,365,842 to Panossian. Using particle damping, energy is dissipated through the inelastic collision and friction between particles and the enclosure. This method may be applied to logging tools, such as acoustic logging while drilling and wireline tools to attenuate tool waves along the tool body. Additionally, this method is expected to be effective for a wide frequency band and suitable for downhole environment especially because of its temperature insensitivity.

Therefore, the incorporation of particle damping for downhole tools, and in particular for logging tools, is proposed.

SUMMARY OF INVENTION

One aspect of the invention is an acoustic logging tool for performing acoustic characterizations of subsurface geological formations. In one embodiment, the tool comprises a generally longitudinally extending tool body adapted for positioning in a borehole. At least one transmitter is mounted on the tool body. At least one receiver is also mounted on the tool body at a location axially displaced from the at least one transmitter. An attenuator is disposed along the tool body. The attenuator comprises at least one cavity having a plurality of particles disposed therein. In some embodiments, a fluid may also be disposed in the at least one cavity.

One or more attenuators comprising one or more cavities with particles disposed therein also may be applied to other downhole tools for reducing tool vibrations to protect tool components or to improve measurement quality.

In another aspect, the invention provides a method for attenuating acoustic energy propagating through a body of an acoustic logging tool. In one embodiment, the method comprises emitting acoustic energy from a first location on the tool; acoustically exciting particles disposed in at least one cavity acoustically coupled to the tool body at a location along an acoustical path through the body from the first location of emitting to a second location of receiving; and receiving attenuated acoustic energy propagated through the body at the second location of receiving.

Other embodiments, aspects, and advantages of the invention will be apparent from the following drawings and description and the appended claims.

BRIEF DESCRIPTION OF DRAWINGS

FIG. 1A is one example of an embodiment of an acoustic logging tool in accordance with the invention which comprises holes having particles disposed therein to attenuate tool waves.

FIG. 2 is one example of a cavity configuration and a particle loading technique that may be used for embodiments of the invention.

FIG. 3 is another example of a cavity configuration and a particle loading technique that may be used for embodiments of the invention.

FIGS. 12A–12C shows three configurations of a steel collar used for an acoustic logging tool and the corresponding hoop resonance illustrating that sharpness of resonance, Q, is significantly reduced by loading holes disposed in the collar with tungsten powder.

DETAILED DESCRIPTION

Figure 1:
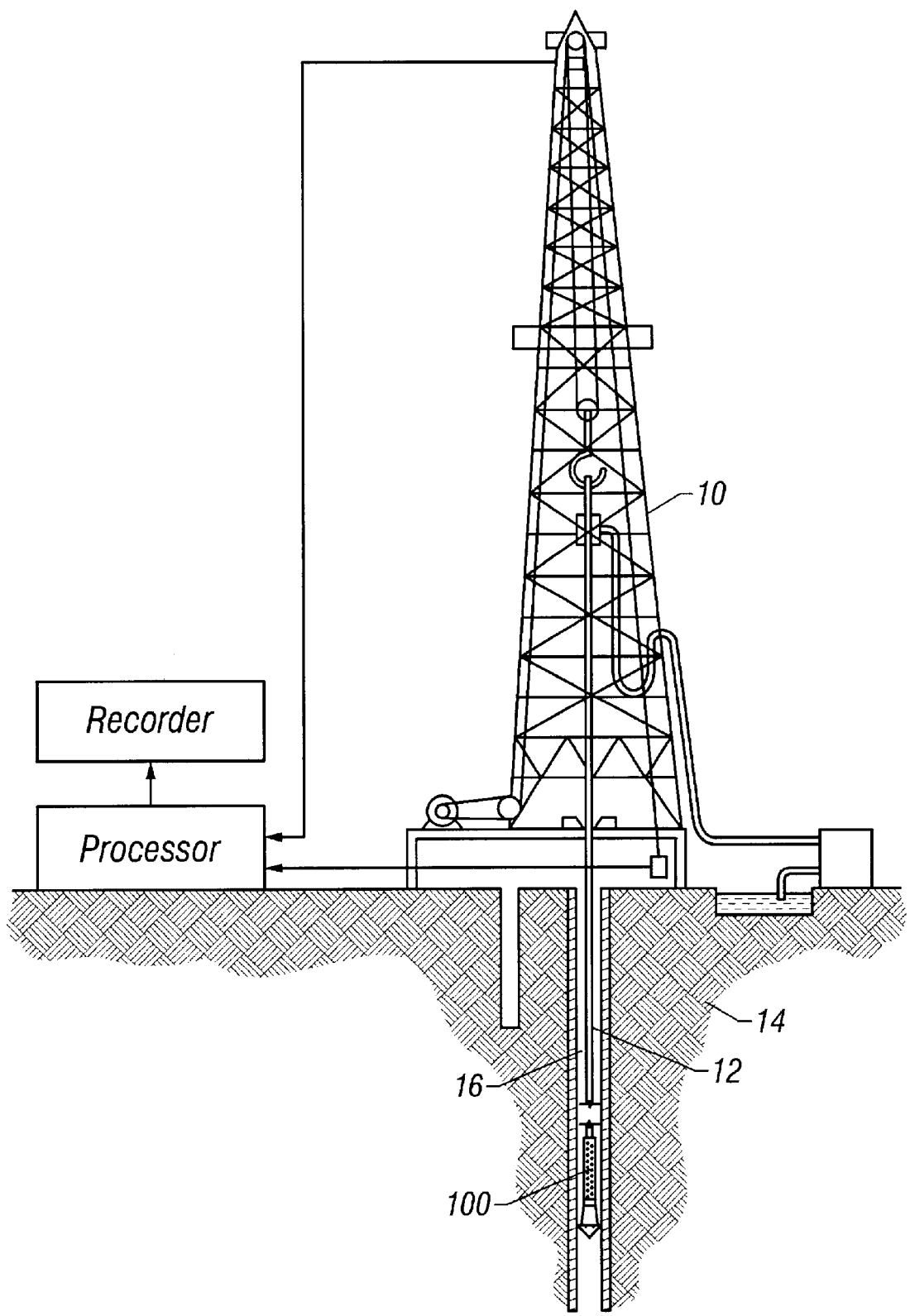
FIG. 1 is a perspective view of a drilling assembly which includes an acoustic logging tool for performing acoustic investigations of subsurface formations in accordance with the invention.

Referring to the drawings wherein like characters are used for like parts throughout the several views, FIG. 1 is a general illustration of a drilling assembly in accordance with the invention. The drilling assembly includes a drill rig 10 coupled to a drilling string 12 having a downhole acoustic logging tool 100 in accordance with the invention coupled to its distal end for performing acoustic investigations of subsurface formations 14 traversed by a bore hole 16.

Figure 9:
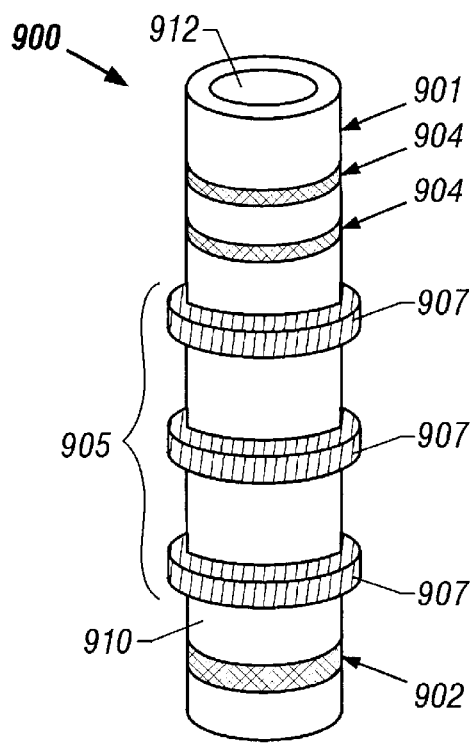
FIG. 9 is another example of an embodiment of an acoustic logging tool in accordance with the invention, which comprises a plurality of hollow rings having particles disposed therein which are affixed to the exterior surface of the body of the acoustic logging tool.

Referring to FIG. 1A, in one embodiment the acoustic logging tool 100 comprises a hollow longitudinally extending body 101 adapted to be placed in a borehole. The tool 100 also comprises at least one transmitter 102 and at least one receiver 104 mounted on the tool body 101 axially spaced apart from each other. Additionally, the tool 100 comprises an attenuator 105 positioned along the tool body 101 to attenuate acoustic energy traveling through the tool body 101. The attenuator 105 comprises a member having one or more cavities 106 disposed therein and a plurality of particles 108 disposed within the one or more cavities 106. The attenuator 105 may be formed integral with the tool body 101 wherein a section of the tool body 101 comprises the member, such as shown in FIG. 1A for example, or the attenuator 105 may be a distinct member coupled to the tool body 101, as shown in FIG. 9 for example.

In the embodiment shown in FIG. 1A, the attenuator 105 is disposed between the at least one transmitter 102 and the at least one receiver 104. Those skilled in the art will appreciate that in other embodiments, the attenuator 105 may be disposed proximal to one or more transmitters 102, such as behind or around the transmitter(s) 102, and/or may be disposed proximal to one or more receivers 104, such as above or around the receiver(s) 104, or anywhere along the tool body 101 there between. Additionally, in other embodiments, the attenuator 105 may be disposed along the tool body 101 above or below transmitter-receiver spacing, such as below the transmitter 102 or above the receiver 104 to reduce reflected acoustical energy from tool or borehole discontinuities above and below or to reduce unfavorable acoustical energy coupled from the surrounding formation back to the tool 100.

Therefore, in general, the attenuator 105 in accordance with the present invention may be disposed at any location along the body 101 of the logging tool 100 without departing from the spirit of the invention.

Those skilled in the art will also appreciate that in general, parameters such as the location, orientation and size of the one or more cavities 106 of the attenuator 105 may vary. Similarly, parameters such as the type, size, and amount of particles 108 within the one or more cavities 106 also may vary. However, preferably the particles 108 disposed within the one or more cavities 106 have a total volume of around 5% to 20% of the total volume of the segment of the tool body 101 along which the attenuator is disposed, which, in this case, is the segment of the tool body 101 between the transmitter(s) 102 and the receiver(s) 104. More preferably, the particles 108 disposed within the one or more cavities 106 have a total volume of at least around 10% of the total volume of the segment of the tool body 101 along which the attenuator 105 is disposed.

As shown in FIG. 1A, the one or more cavities 106 of the attenuator 105 may comprise a plurality of holes 107 disposed within the tool body 101 and having a plurality of particles disposed within each of the holes 107. The holes 107 may be arranged to form a plurality of circumferencial rows spaced apart at selected axial intervals. For example, each row may comprise four or more holes 107 azimuthally arranged at substantially evenly spaced intervals about the longitudinal axis of the tool 100. This arrangement, advantageously, may result in the conversion of lower-order tool arrival modes to higher-order modes that do not propagate significant distances along the tool body 101. For example, a portion of a monopole tool mode may be converted to an octopole tool mode when the monopole tool mode interacts with a row of four evenly spaced holes.

In embodiments where the holes 107 are arranged in rows, each row may be azimuthally offset from an adjacent row, as illustrated by the rows labeled "Row A" and "Row B" in FIG. 1A. In the case of higher order modes, such as dipole modes, wherein two orthogonal modes of different azimuthal directions exists, azimuthally staggering the holes 107 from one row to the next may, advantageously, ensure that both orthogonal modes undergo mode conversion as described above.

Additionally, the holes 107 may be configured in a number of different ways. For example, as illustrated in FIG. 2, one or more holes 207 may extend only a portion of the way through the tool body 101. In the example in FIG. 2, the hole 207 is disposed in the exterior surface 210 of the tool body 201 and extends therefrom in a direction substantially perpendicular to the exterior surface 210 at a depth of less than the thickness of the wall of the tool body 101. Those skilled in the art will appreciate that in other embodiments, the attenuator may comprise holes disposed on a different surface of the tool body 101, such as on the interior surface 212. Additionally, the holes may extend in any desired direction, such as at an angle with respect to the penetrated surface or tangentially with respect to a point on the surface.

In general, with reference to FIG. 2, the one or more cavities 206 of the attenuator 205 may be filled to any desired capacity with particles 208. However, in preferred embodiments, the particles 208 may substantially fill the one or more cavities 206 of the attenuator 205 to the extent that the particles are not compacted. Further, particles 208 disposed in a cavity 206 may be retained therein by any retaining mechanism or retainer 209 suitable for downhole environments.

In the example shown in FIG. 2, the retainer 209 comprises a plug 211. In addition to retaining the particles 208 in a cavity 206, the retainer 209, preferably, also seals a cavity 206 to prevent drilling fluid or other contaminants from entering the cavity 206 during tool operations. Preferably, the retainer 209 is flush with the exterior surface of tool body 101. In some embodiments, the retainer 209 may also be adapted to allow for pressure compensation.

Additionally, in general, a fluid 208a, such as water, oil, drilling fluid, a fluorocarbon lubricant, a polymer, or a gel, suitable for downhole operations, may be disposed within the cavity and surround particles 208 in the cavity 206. In some embodiments, liquid saturation of the particles may also provide some pressure compensation. In the case of dry particles, preferably the particles are pressure protected so that they do not become compacted by the downhole pressures.

Another example of an attenuator cavity configuration and particle loading technique, is illustrated in FIG. 3. In this example, the cavity 306 comprises a hole 307 that extends through the entire thickness of the wall of the member 301. A container 313 filled with particles (not shown) is placed within the hole 307. The retainer that retains the container 313 in the hole 307 comprises a retaining ring 318 and an O-ring seal 316. The retaining ring 318 primarily holds the container 313 in place. The O-ring seal 316 primarily prevents drilling fluid or other contaminants from flowing through the hole 307. A particle-filled container, as shown in FIG. 3, may be desired in some embodiments to allow for easier loading and unloading of particles in the one or more cavities and/or easier maintenance of the tool.

Figure 4:
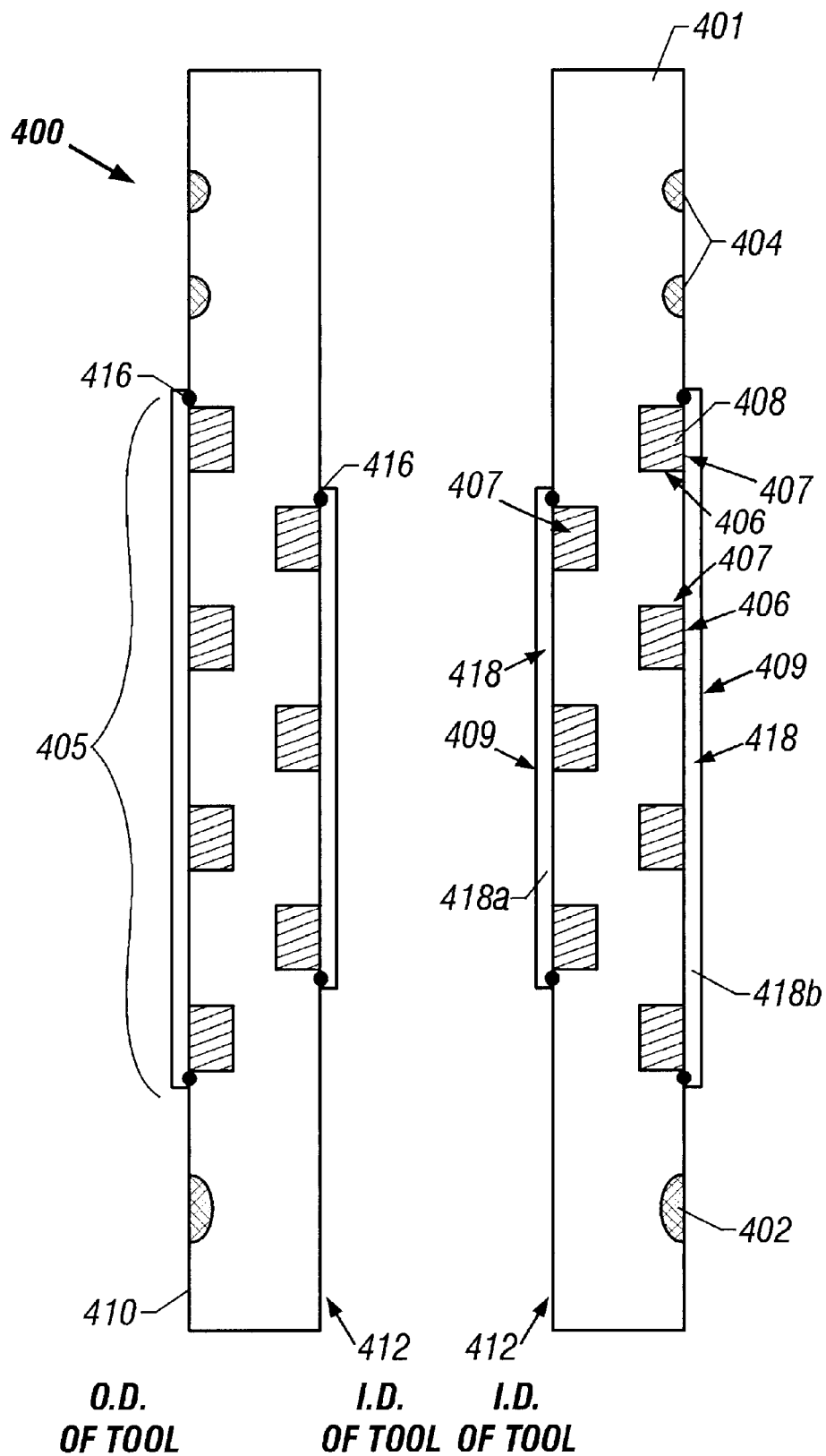
FIG. 4 is another example of an embodiment of an acoustic logging tool in accordance with the invention which comprises grooves having particles disposed therein.
Figure 5:
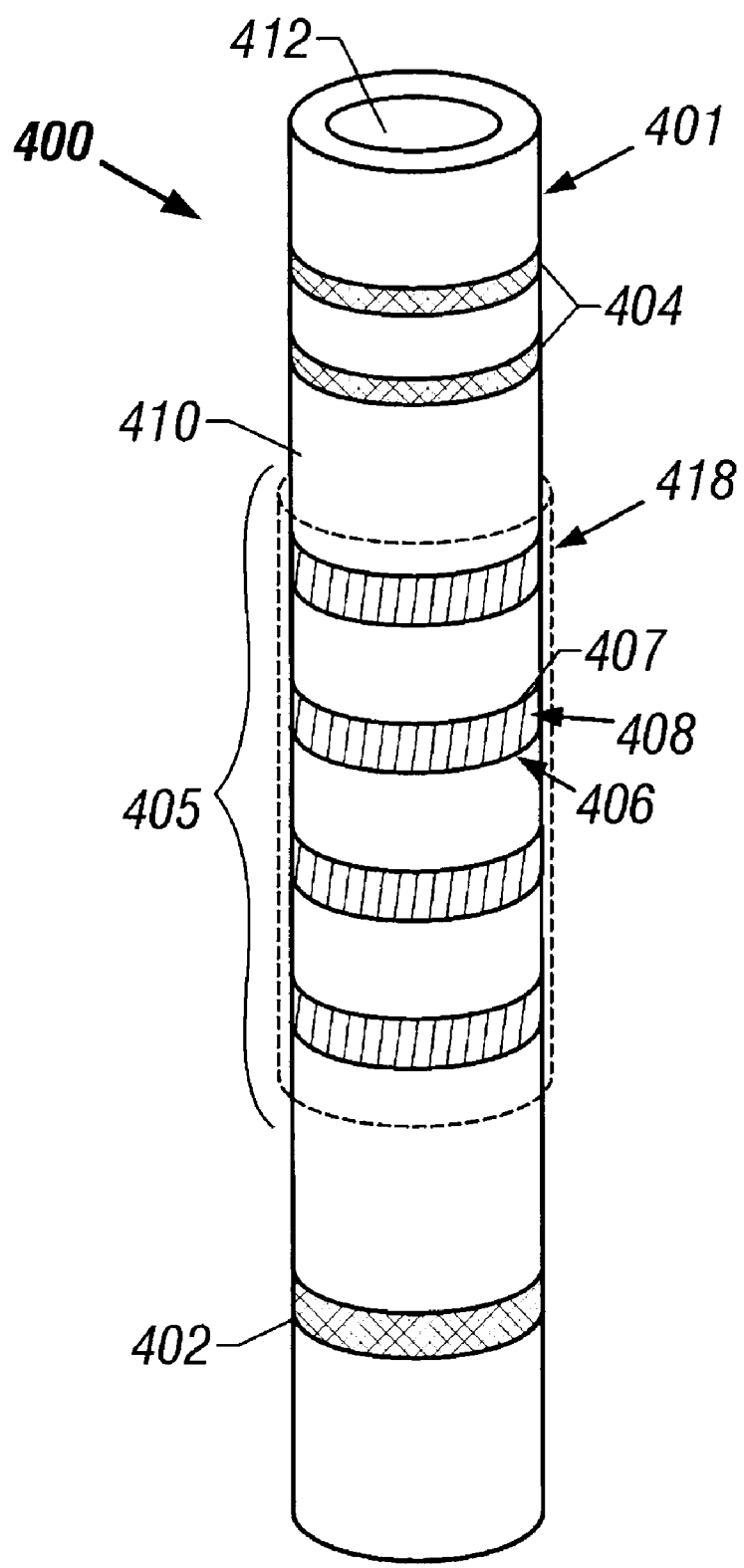
FIG. 5 shows the perspective view of the embodiment shown in FIG. 4.

Another embodiment of an acoustic logging tool in accordance with the present invention is illustrated in FIGS. 4 and 5. FIG. 4 is a cross section view of the acoustic logging tool 400. FIG. 5 is a perspective view of the acoustic logging tool 400 in FIG. 4. In this embodiment, the acoustic logging tool 400 comprises a longitudinally extending tubular body 401 having at least one transmitter 402 and at least one receiver 404 mounted thereon and an attenuator 405 disposed there between. The tool 400 further comprises an attenuator 405 formed integral with a segment of the tool body between the transmitter(s) and the receiver(s). The attenuator 405 comprises a plurality of cavities 406. Each of the cavities 406 has a plurality of particles 408 disposed therein.

As described for the previous embodiment, the location, orientation, and size of the cavities 406, as well as, the type, size, and amount of the particles 408 in the cavities 406 vary may. However, preferably the total volume of the particles 408 in the cavities 406 is between around 5% to around 20% of the total volume of the segment of the tool body 401 along which the attenuator 405 is disposed.

Referring to FIG. 4, the cavities 406 in this embodiment comprise grooves 407. The grooves are disposed on an interior surface 412 and an exterior surface 410 of the tool body 401 between the transmitter(s) 402 and the receiver(s) 404. In other embodiments, the grooves 407 may be disposed on only the interior surface 412 or on only the exterior surface 410 of the tool body 401. Additionally, in other embodiments, the attenuator 405 may comprise a separate member with respect to the tool body 401 that couples to the tool body 401. Further, the grooves 407 may be formed and arranged on the tool body 401 as described in U.S. Pat. No. 5,852,587 to Kostek et al, incorporated herein by reference.

As described above, in this embodiment the grooves on the interior surface 412 and the exterior surface 410 of the tool body 401 each have a plurality of particles 408 disposed therein. However, in other embodiments, the particles may be placed in only one or more interior grooves 407 or in only one or more exterior grooves 407.

Advantageously, an acoustic logging tool 400 in accordance with this embodiment provides the benefit of two different mechanisms to attenuate the tool signal. The same may be true in other embodiments. For example, if the grooves 407 are arranged on the tool 400 as disclosed in U.S. Pat. No. 5,852,587 to Kostek et al., and particles 408 are placed in a plurality of the grooves 407 in accordance with the present invention, the periodic structure of the grooves 407 will attenuate the tool signal in a narrow frequency band while the particles 408 attenuate the tool signal in a broader frequency band.

As shown in FIG. 4, the particles 408 disposed within the cavities 406 along the tool body 401 are retained in place by a retainer 409. In this embodiment, the retainer comprises an internal retaining sleeve 418a and an external retaining sleeve 418b. The retaining sleeves 418 are adapted to cover the interior surface 412 and the exterior surface 410 of the tool body 401 making up the attenuator 405 to hold particles 408 disposed in the grooves 407 in place. The retaining sleeves 418 also, preferably, prevent drilling fluid from entering the grooves 407, for example, by isolating or sealing the grooves 407 from fluids and/or particles that may be present in the surrounding environment. For example, a sealing mechanism, such as one or more O-rings (416 in FIG. 4), may be used at the ends of each sleeve 418 to provide a seal between each sleeve 418 and a surface of the attenuator 405 as shown. The retaining sleeve 418 may be formed of any suitable material known in the art, including metals, alloys, or thermoplastic composites.

Those skilled in the art will appreciate that although the sleeves 418 in FIG. 4 are shown as extending somewhat radially outward with respect to the surface of the tool body 401, a recess (not shown) may be provided in the surface of the attenuator 405 for the sleeves 418 so that the sleeves 418 will be flush with respect to the interior tool surface 412 and the exterior tool surface 410 above and below the attenuator 405 of the tool 400. Additionally, the tool 400 may comprise a fill mechanism, such as a closable opening (not shown) in the retaining sleeves 418 through which the grooves 407 may be filled with particles 408.

Figure 6:
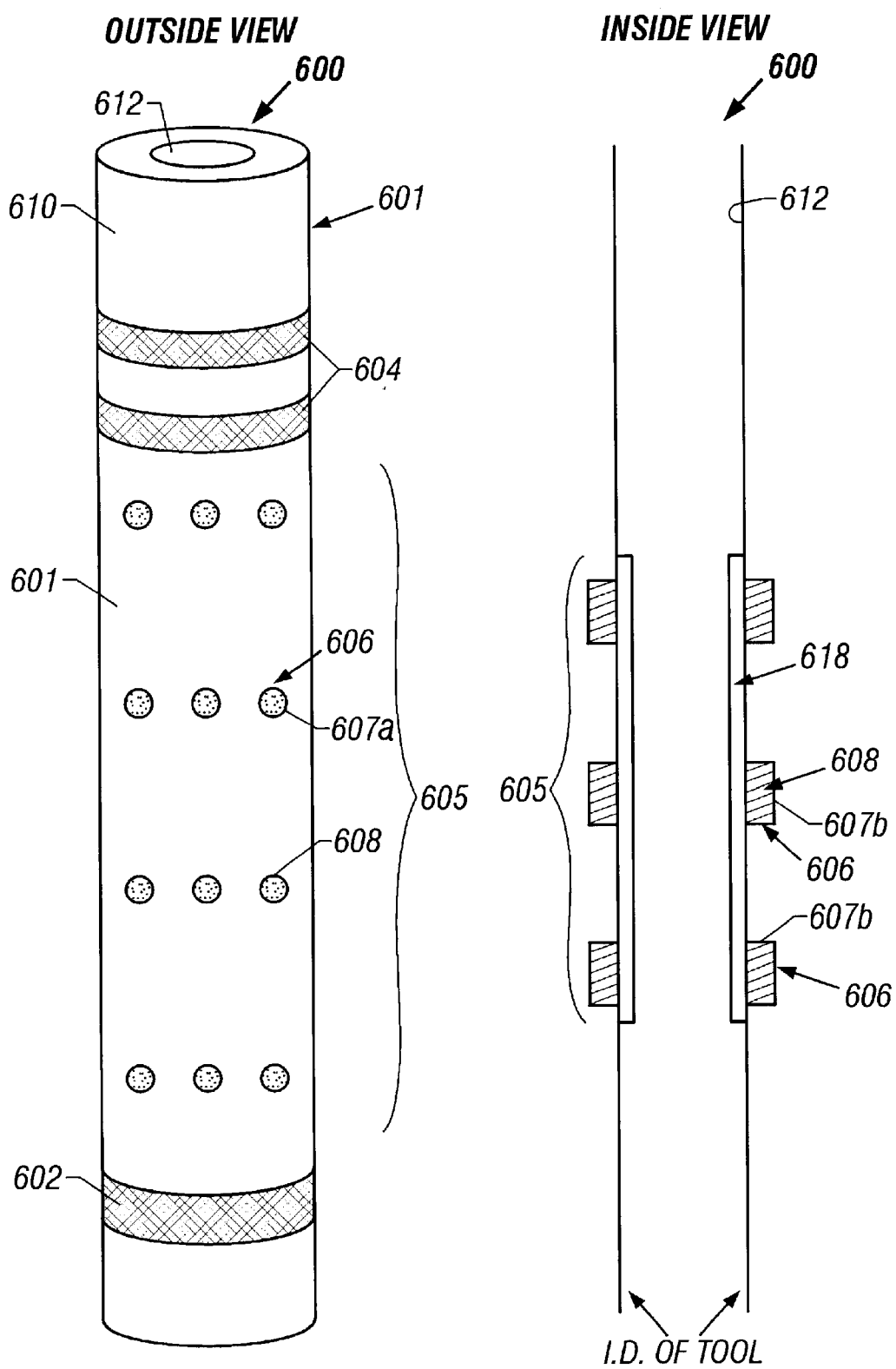
FIG. 6 is another example of an embodiment of an acoustic logging tool in accordance with the invention which comprises grooves and holes having particles disposed therein.
Figure 6A:
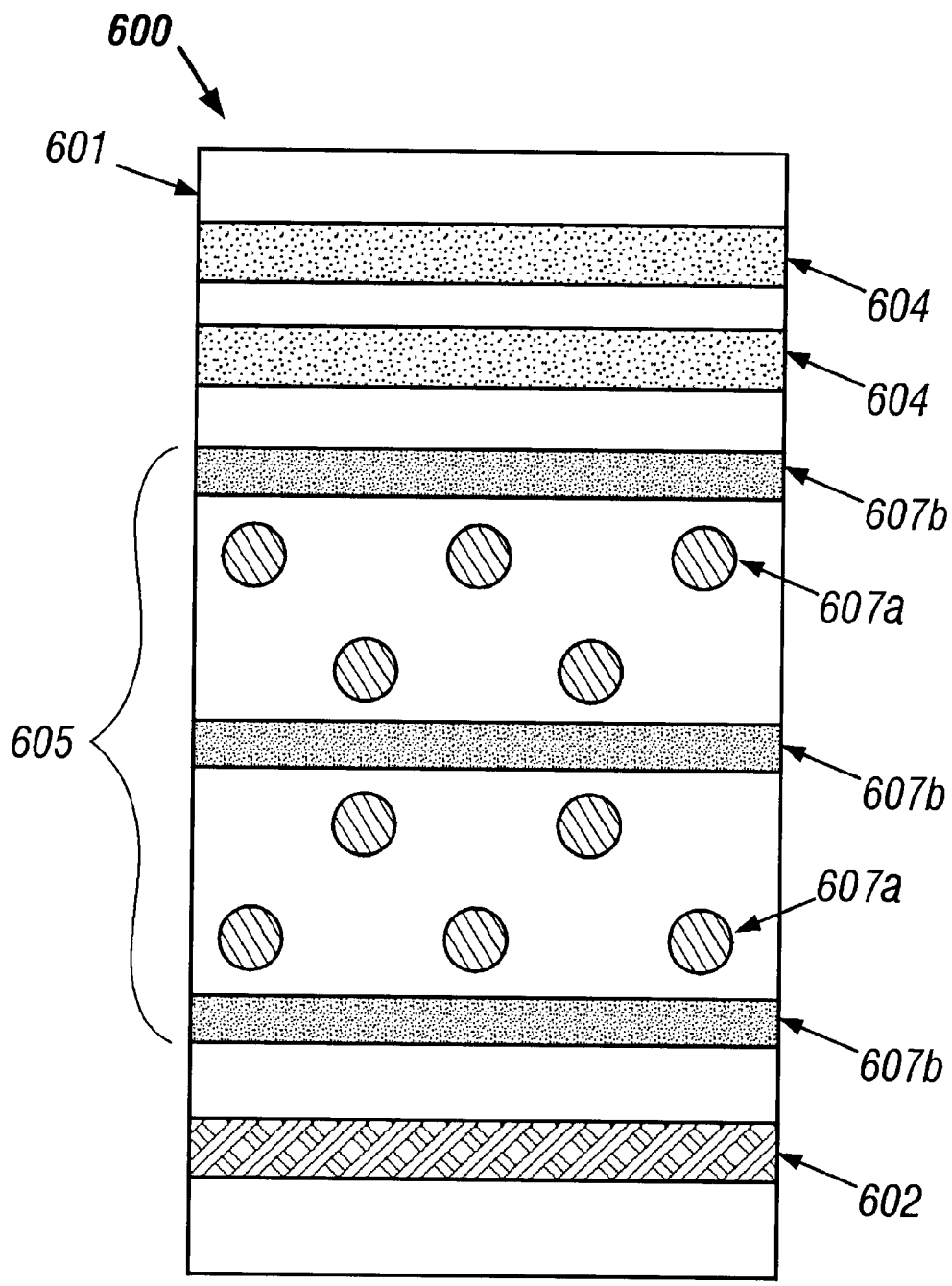
FIG. 6A is another example of an embodiment of an acoustic logging tool in accordance with the invention which comprises grooves and holes having particles disposed therein.

Another embodiment of an acoustic logging tool in accordance with the present invention is shown in FIG. 6. In this embodiment, the acoustic logging tool 600 comprises a longitudinally extending body 601 having at least one transmitter 602 and a plurality of receivers 604 mounted thereon and an attenuator 605 disposed there between. The attenuator 605 comprises a plurality of cavities 606 filled with particles 608. In this embodiment, the cavities 606 comprise holes 607a and grooves 607b and the member of the attenuator 605 comprises a segment of the tool body 601 between the at least one transmitter 602 and the plurality of receivers 604. The holes 607a are disposed on the exterior surface 610 of the tool body 601. The grooves 607b are disposed on the interior surface 612 of the tool body 601. In other embodiments, both holes 607a and grooves 607b may be disposed on an exterior surface 610 and/or an interior surface 612 of the attenuator 605, as shown for example in FIG. 6A.

Referring to the embodiment in FIG. 6, at least some of the holes 607a and/or grooves 607b have a plurality of particles 608 disposed therein. The particles 608 disposed in the holes 607a are retained therein, for example, by one of the methods discussed above with respect to the first embodiment and illustrated in FIGS. 2 and 3. Particles 608 in the grooves 607b are disposed therein and retained therein by a retainer, such as a retaining sleeve 618 previously discussed with reference to FIG. 4. Having cavities with particles disposed therein as discussed above may advantageously result in mode conversion as previously discussed.

Figure 7:
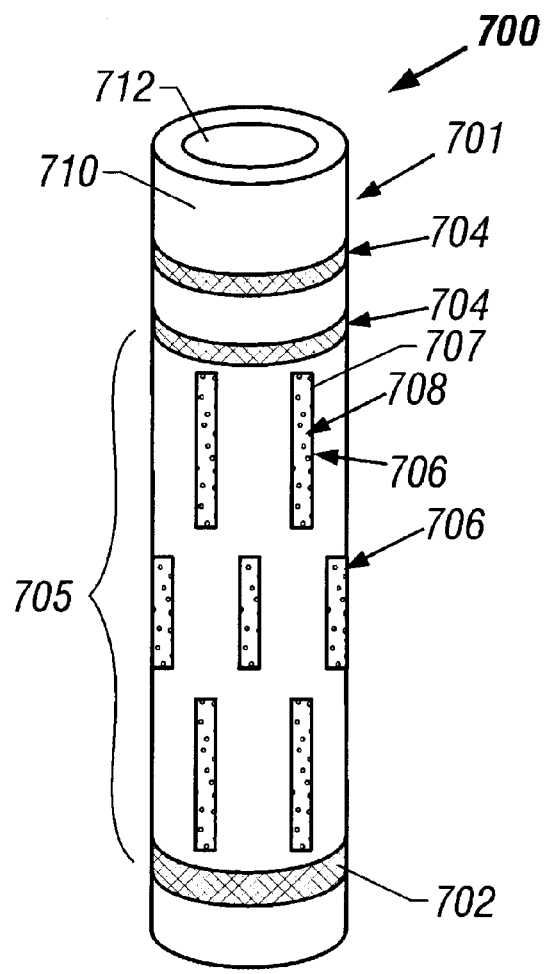
FIG. 7 is another example of an embodiment of an acoustic logging tool in accordance with the invention which comprises a plurality of slots on the exterior surface of the body.

Another embodiment of an acoustic logging tool in accordance with the invention is shown in FIG. 7. In this embodiment, the acoustic logging tool 700 comprises a longitudinally extending body 701 having at least one transmitter 702 and at least one receiver 704 mounted thereon and an attenuator 705 disposed there between. The attenuator 705 comprises a plurality of cavities 706 having particles 708 disposed therein. In this embodiment, the plurality of cavities 706 comprise a plurality of slots 707 cut along the exterior surface of the tool body 701. Although the slots 707 are shown as being oriented axially (parallel to the axis of the logging tool), those skilled in the art will appreciate that in other embodiments the slots 707 may be oriented axially, radially, tangentially, obliquely, or combinations thereof. If the slots 707 are oriented axially, as shown, preferably at least four slots 707 are disposed around the circumference of the tool body 701. In the axial direction, the slots 707 may or may not be in line with one another. Additionally, multiple slots 707 arranged circumferentially about the tool body 701 may advantageously result in mode conversion as discussed for previous embodiments.

Figure 8:
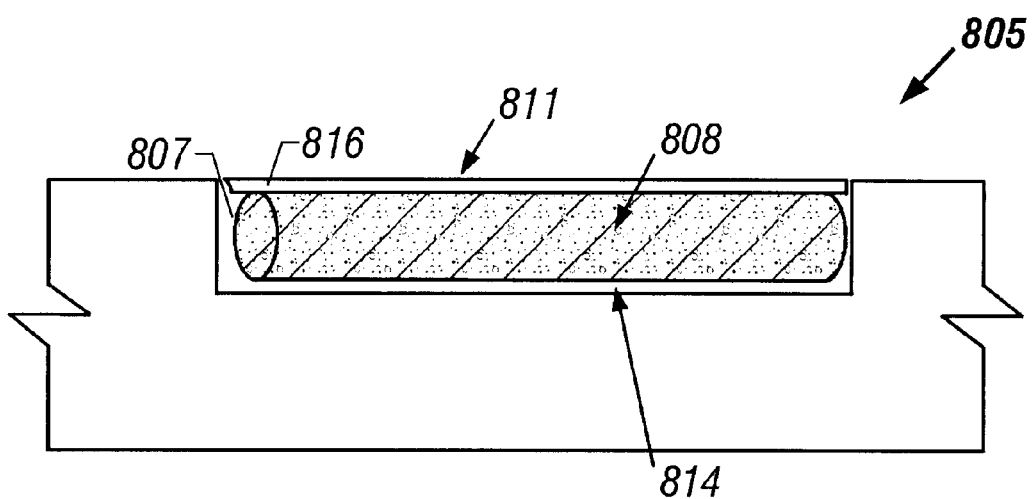
FIG. 8 shows one example of a method for filling the slots shown in FIG. 7 with particles.

FIG. 8 is an illustration of one method for filling slots of an attenuator 805 with particles 808 disposed within a container 814. In this example, the container 814 comprises a tube filled to a desired capacity with particles 808. The container 814 is placed within a slot 807 of the attenuator 805 and retained in the slot 807, for example, by welding it to the surface forming the slot 807 or otherwise attaching or coupling it to the surface of the slot 807. Those skilled in the art will appreciate that numerous other methods for attaching a member to a surface are well known in the art and may be used as determined by a skilled artisan. For example, the container 814 may be retained and/or protected in the slot 807 by a retainer 816, such as cover plate 811 or a retaining sleeve as previously described for the embodiment of FIG. 4. In addition to being held in place by a retainer 816, the container 814 may be also welded or otherwise attached to the slot surface.

Figure 9A:
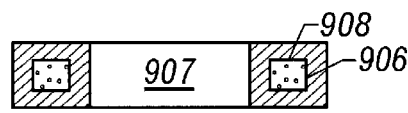
FIG. 9A is a cross sectional view of a hollow ring shown in FIG. 9.

Another embodiment of an acoustic logging tool in accordance with the present invention is illustrated in FIG. 9. In this embodiment, the tool 900 comprises a tool body 901 having at least one transmitter 902 and at least one receiver 904 mounted thereon and at least one attenuator 905 disposed there between. In this embodiment, the attenuator 905 comprises a member affixed to an exterior surface of the tool body 901 and having at least one cavity with particles 908 disposed therein. The at least one cavity comprises a hollow section formed inside one or more rings 907 affixed to the exterior surface 910 of the tool body 901. A cavity 906 formed inside of a ring 907 is illustrated, for example, in FIG. 9A. Each ring 907 has at least one cavity 906 with particles 908 disposed therein.

Referring to FIG. 9, alternatively or additionally, the at least one attenuator 905 may be affixed to the interior surface 912 of the tool body 901. The one or more attenuators 905 may be affixed to the tool body 901, for example, by heat-shrink fit or other attachment methods known in the art.

Figure 10:
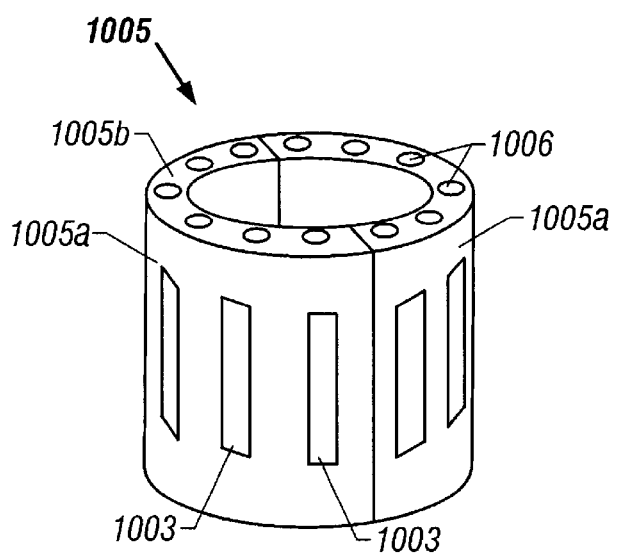
FIG. 10 shows one example of an attenuator in accordance with the invention which comprises a particle-loaded backing plate accommodating transducers for mounting to the body of an acoustic logging tool.

Another embodiment of an attenuator adapted to mount on an acoustic logging tool is illustrated in FIG. 10. In this embodiment the attenuator 1005 is a particle-damping backing plate for an acoustic transducer. The backing plate 1005 comprises a cylindrical member 1005a on which one or more transducers (i.e., transmitters or receivers) may be mounted. The backing plate is adapted to mount on an acoustic logging tool. In this example, the cylindrical member 1005a comprises two halves of a cylindrical metal frame. Each half of the cylindrical member 1005a comprises cavities 1006 formed therein which extend axially from the top surface 1005b of the cylindrical member 1005a through the wall of the cylindrical member 1005a between the interior surface and exterior surface of the cylindrical member 1005a. The cavities 1006 are arranged at azimuthally spaced apart locations and may extend any selected depth into the wall of the cylindrical member 1005a.

Particles (not shown) are disposed within each of the cavities 1006 to form particle-damping units. The cavities 1006 are then sealed on one or both ends, depending on the depth of the holes, to retain the particles in the cavities 1006, preferably in substantially atmospheric pressure. Transducers 1003, such as piezoelectric elements, are then directly mounted on the outside surface of each of the halves of the cylindrical member 1005a. The cylindrical member 1005a is then molded in a material, such as rubber and then mounted on the tool body (not shown). In a preferred embodiment, the two halves of the cylindrical member 1005a forming the backing plate are molded in viton and then mounted on the tool body.

Figure 11:
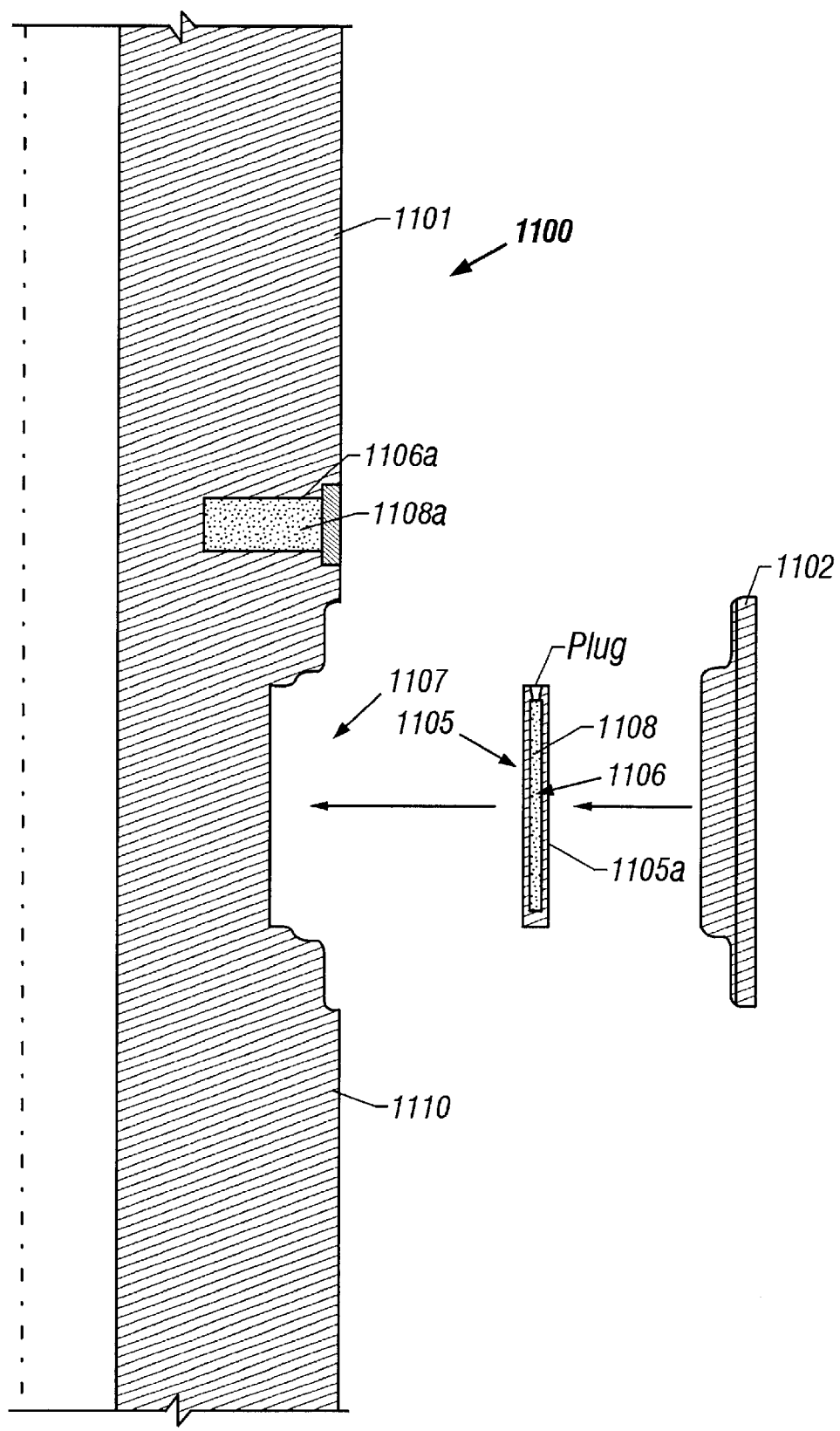
FIG. 11 shows another example of an attenuator in accordance with the invention which comprises a heavimet insert which can be positioned in a groove between the transmitter or receiver and the tool body. The insert is thus a backing for the transmitter or receiver.

Another embodiment of an acoustic logging tool in accordance with the invention is shown in FIG. 11. In this embodiment, the tool 1100 comprises a cylindrical body having at least one transmitter, at least one receiver, and an attenuator mounted along the tool body. The attenuator 1105 comprises at least one cavity 1106 having a plurality of particles 1108 disposed therein. In this embodiment, the at least one cavity 1106 is disposed in a heavimet insert (i.e., a tungsten/steel alloy insert) 1105a configured to fit within a transducer groove 1107 formed on an exterior surface of the tool body 1101 between the tool body 1101 and at least one transducer (not shown) when mounted thereon. By positioning a heavimet insert 1105a having a cavity 1106 with particles 1108 disposed therein (not shown) between the tool body 1101 and a transducer 1102 coupled to the body 1101, the acoustic signal transferred between the transducer 1102 and the tool body 1101 can be attenuated. Additionally, positioning a heavimet insert as described above may also significantly isolate the transducer from the tool body 1101.

In general, acoustic logging tools in accordance with the invention may include additional attenuation features, such as combinations of attenuation features described above or derivations thereof. For example, as shown in FIG. 11, in addition to having a heavimet insert 1105a positioned between the transducer 1102 and tool body 1101, the tool 1100 may further comprise one or more holes 1106a disposed in the tool body 1101 and having particles 1108a disposed therein.

Additionally, attenuators involving particle damping features as described above may be used in conjunction with other prior art methods of tool wave attenuation. For example, particle damping features may be used in conjunction with grooves as discussed in U.S. Pat. No. 5,852,587 to Kostek et al. and currently provided in the acoustic logging tool operated under the trademark ISONIC by Schlumberger Technology Corporation of Sugar Land, Tex., the Assignee of the present invention. Similarly, particle damping features may also be used in conjunction with any of the methods discussed in U.S. Pat. No. 5,796,677 to Kostek et al. and U.S. Pat. Nos. 5,644,186 and 5,510,582 to Birchak et al.

Parameters which may be considered in the design of an attenuator according to the invention may include the number of cavities, placement of the cavities, the shape of the cavities, the arrangement of the cavities, and the percent volume of cavities (percentage ratio of the total volume of cavities to the original total volume of the tool body in the segment of attenuation). Other parameters considered may include the material composition of the particles, the shape, size, or specific gravity, of the particles, whether the particles will be dry or fluid saturated, the type of fluid (fluid includes gas and liquid) surrounding the particles, the amount of particles in each cavity, and the percent volume of the particles (percentage ratio of the total volume of the particles to the original total volume of the tool body in the segment of the attenuation). Depending on the particular application, such as attenuating monopole or dipole tool waves, the best parameters are selected, preferably, to achieve the objectives of maximizing the energy coupling from the tool body into the particles and maximizing the energy dissipation through the particles. Those skilled in the art will appreciate that these and other parameters may be varied or altered as desired to optimize tool wave attenuation for particular applications.

For example, the particles preferably are substantially rounded to avoid jagged edged particles from hindering movement in the cavity. Other particle characteristics to be considered may include the coefficient of restitution, the density, operating temperatures, and the size of the particles. It is well known in the art that lower coefficients of restitution result in higher energy loses. However at the same time, it may be preferred to have particles that can move freely relative to each other rather than particles that clump together. Preferably, the particles are significantly smaller in size than the wavelengths to be attenuated in the tool body. For example, for some sonic logging tools, particle sizes from around 5 microns to around 500 microns may be preferred. However, these sizes are only examples. The invention is not intended to be limited by the particle size. Those skilled in the art will also appreciate that selected particles should be stable at borehole temperatures.

Any particle material may be used in accordance with the invention as determined by a skilled artisan. Preferred particle materials may include tungsten, tungsten carbide, aluminum, and lead. Other particle materials, such as ceramics or high temperature plastics, for example, may also be used. In one embodiment, for example, the particles comprise tungsten carbide powder around 50 microns in size. Additionally, the particles may be disposed in a fluid such as water, oil, drilling mud, fluorocarbon lubricant, polymer, and/or gel. The configuration of liquid saturation may provide some pressure balance between the particle volume and the external mud and, thus, reduce the required strength of the particle containing device. The addition of a liquid affects the coupling between the tool body and the particles. Also, the viscosity of the liquid contributes to the attenuation of acoustic energy.

Because the relative motion among the particles and between the particles and the cavity walls contributes to the energy dissipation, one objective in the design of the attenuator should be to maximize this relative motion for specific tool wave modes of concern. In general, the tool body design must also assure mechanical strength of the collar (or tool body) for drilling operations.

The concepts disclosed herein may also be adapted to dissipate vibration energy of any part of a downhole tool, including wireline and LWD tools. For example, particle damping in accordance with the above may be adapted to protect vibration-sensitive components such as circuit boards and sensors coupled to a tool body. Particle damping of tool vibrations may also improve measurement quality by stabilizing tool sensors.

Those skilled in the art will appreciate that in other embodiments of the invention, the one or more cavities of the attenuator may comprise different configurations than disclosed herein without departing from the spirit of the invention. Additionally, various structures and methods known in the art for retaining the particles within their respective cavities may also be used.

Experiments have been conducted for an attenuator in accordance with features of the invention. Laboratory experiments have shown that it is possible to lower the sharpness of resonance, Q, of a steel tool body from a few thousand to about ten when around 10% to 15% of the volume of the tool body between the transmitter(s) and receiver(s) comprises cavities filled with tungsten particles. Sharpness of resonance, Q, is a measure of oscillation response of an element to an oscillating stimulus. Sharpness of the resonance, Q, may be formally defined as the ratio of peak power (resonance) frequency, $\omega_0$, to the frequency bandwidth, $\delta\omega$, which is the difference of the half power frequencies above and below the resonance frequency, ($\omega_0/\delta\omega$).

FIGS. 12A, 12B, and 12C show hoop resonance corresponding to three different configurations of a steel collar (i.e., tool body). FIG. 12A shows the sharpness of resonance 1202 corresponding to a solid collar 1200 having no cavities formed therein. FIG. 12B shows the sharpness of resonance 1214 corresponding to a collar 1210 comprising a plurality of cavities 1212 longitudinally disposed in the wall of the collar 1210 at selected azimuth intervals. FIG. 12C shows the sharpness of resonance 1224 (amplified by 1000 at 1225) corresponding to a collar 1220 comprising a plurality of cavities 1222 as shown in FIG. 12B, but further comprising tungsten powder disposed within each of the cavities 1222, substantially filling the cavities 1222.

In comparing the responses of the steel collar comprising holes without particles and the steel collar comprising holes filled with tungsten powder comprising around 10% of the total volume of the collar, it was found that the sharpness of resonance, Q, decreased from 1523 to 30. Thus particle damping may significantly improve the damping characteristics of a collar.

Figure 13:
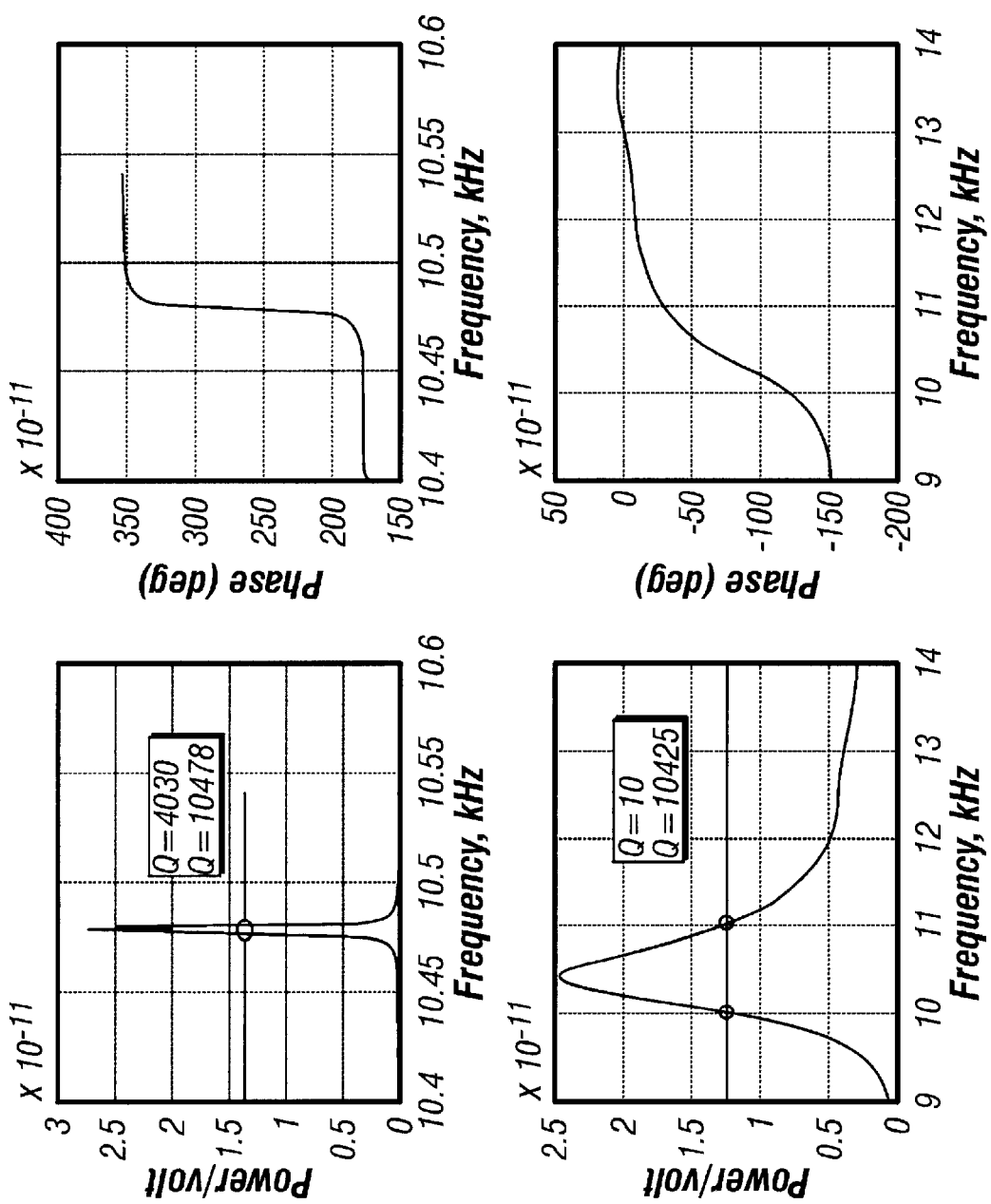
FIG. 13 shows data obtained from a test involving two steel bars having holes therein, wherein the percentage volume of the bars filled with tungsten powder versus the measured sharpness of resonance, Q, was observed for three different acoustic waves.

FIG. 13 shows the results from another laboratory experiment involving particle damping for a steel bar. In this experiment, the steel bar comprised a plurality of holes of total volume of about 10% of the steel bar. Two measurements were conducted: one with these holes empty and the other with these holes filled with tungsten carbide powder of around 50 microns in size. The figure shows both power (velocity squared) and phase angle as functions of frequency measured by an accelerometer at one end of the bar. The bar was driven around its longitudinal resonance. This resonance was very sharp (Q about 4000) without particle loading and was much damped (Q about 10) with the particle loading. From experimental observations, while particle-filled volumes of any amount may be used in accordance with the invention as described above, particle-fill volumes of around 5% to 20% may be considered more desirable and particle fill volumes of around 10% to 15% may be preferred.

Figure 14:
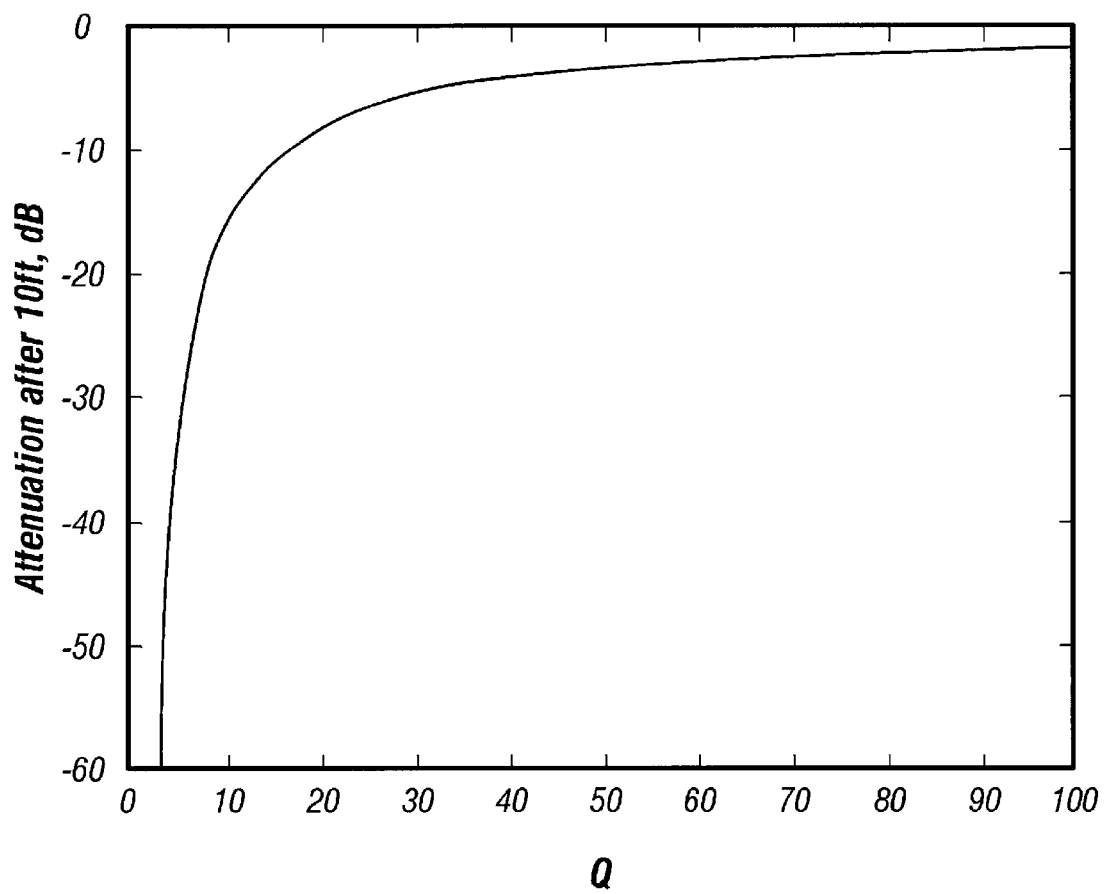
FIG. 14 is an example of calculated attenuation of wave propagation as a function of sharpness of resonance, Q.

FIG. 14 shows the conversion from the Q (sharpness or quality of resonance) of a structure to the attenuation or decay of wave energy propagating along the structure. The wave amplitude decays as $\exp(-\pi/Q)$ for each wavelength. The calculation assumed steel extensional wave speed of 5000 m/sec and a frequency of 10 kHz. As an example, a Q of 10 would result in 16 dB attenuation with 3.3 m of spacing between the transmitter(s) and receiver(s).

Figures 15A, 15B, 15C:
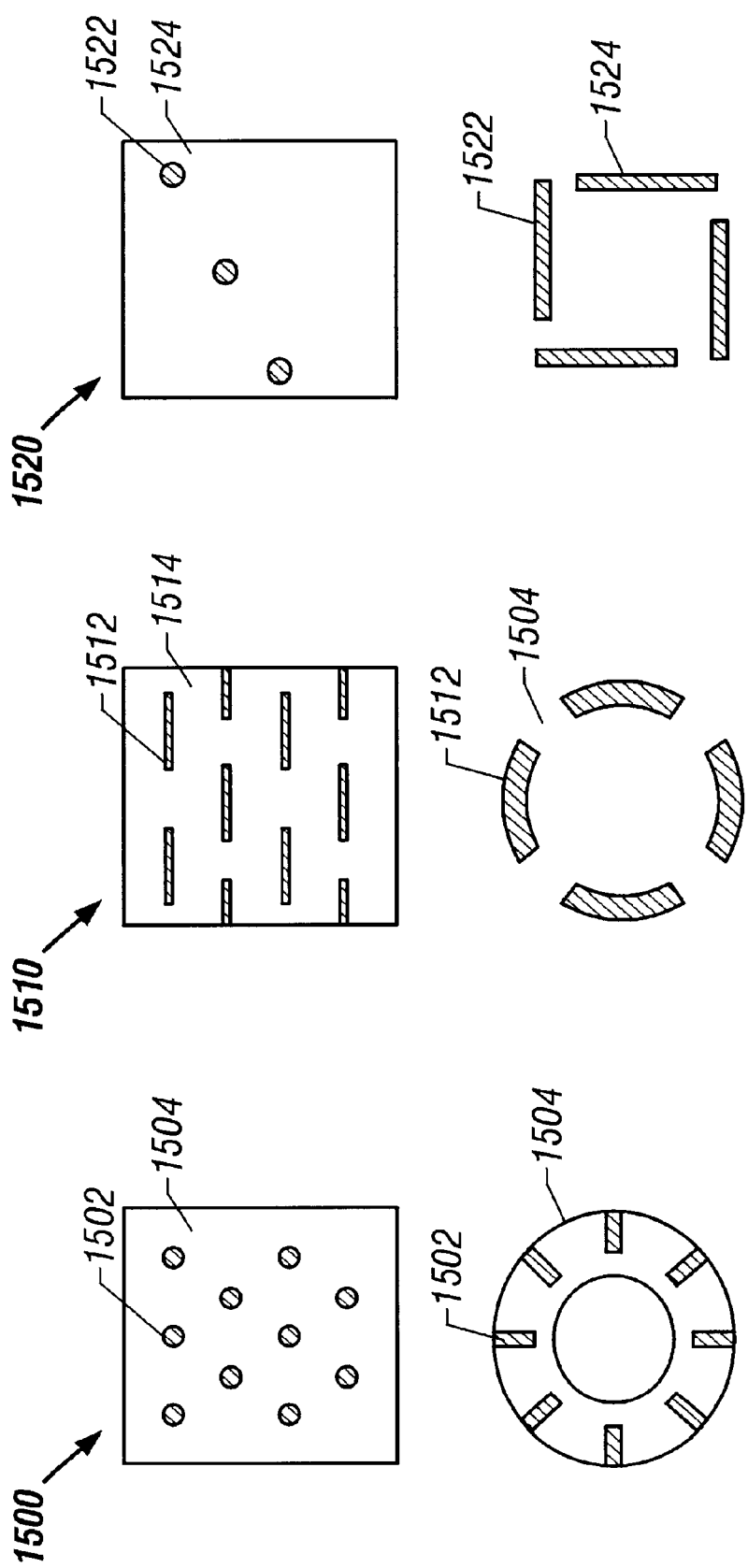
FIGS. 15A–15C shows schematics of three example cavity configurations for an attenuator in accordance with the present invention.

FIGS. 15A, 15B, and 15C show schematics of example configurations for arranging cavities (indicated in black) in a collar. The upper schematic in each figure represents a perspective view of the collar and the lower schematic represents a lateral cross section view. In the example shown in FIG. 15A, the collar 1500 comprises a plurality of circular holes 1502 disposed in the exterior surface 1504 of the collar 1500 and arranged in a plurality of azimuthally continuous rows. The rows are arranged substantially evenly spaced apart at selected intervals along the central axis of the collar 1500. In the example shown in FIG. 15B, the collar 1510 comprises a plurality of grooves 1512 disposed in the exterior surface 1514 of the collar 1510. The grooves 1512 are arranged in a plurality of azimuthally continuous rows substantially evenly spaced at selected intervals with respect to the central axis of the collar 1510. In the example shown in FIG. 15C, the collar 1520 comprises a plurality of holes 1522 arranged in a plurality of azimuthally arranged rows. The rows are spaced apart at selected intervals along the central axis of the collar 1520. The holes 1522 on each row have entrances azimuthally arranged at evenly spaced intervals. The holes 1522 are drilled to extend laterally therethrough in a direction somewhat tangential with respect to a point on the surface of the collar 1520 which allows for maximum lateral penetration through the wall with sufficient material remaining between the truncated end of the hole and any adjacent void or exterior wall surface 1524 to maintain structural integrity of the collar 1520.

The schematics shown in FIGS. 15A, 15B, and 15C and embodiments illustrated in the other drawings have been provided as examples of attenuator configurations that may be used. Those skilled in the art will appreciate that numerous other configurations can be derived based on the above disclosure. For example, in other embodiments the cavities may have different cross sections or lengths than illustrated herein. Cavities may also be arranged in any desired configuration or positioned in any desired orientation. Also, tools designed in accordance with the invention may comprise one or more attenuators without departing from the spirit of the invention.

In particular, a logging tool in accordance with the invention comprises at least one attenuator which comprises one or more cavities having a plurality of particles disposed therein. For example, for efficient energy transfer from the tool body to the particles, the orientation of a cylindrical hole is preferably perpendicular to the motion of the tool body associated with a particular tool wave of concern. For sonic frequencies, the size of a cylindrical hole for containing particles is preferably not greater than ½ inch in diameter.

Those skilled in the art will appreciate that in configuring embodiments for specific applications, one objective should be to achieve the maximum attenuation of the mode(s) of concern within the constraint of mechanical strength for drilling operation. Since the relative motion between particles and cavity walls is a basic mechanism contributing to the energy dissipation, one design objective should be to maximize this relative motion for specific modes of tool wave of concern. The resulting design should also assure the required mechanical strength of the collar for drilling operation. These concepts are also applicable for controlling tool vibrations and reducing shock effects on components of wireline as well as LWD tools.

The attenuation of particle damping could also be used in conjunction with periodic grooves, as found on the logging tools operated under the trademark ISONIC and discussed in U.S. Pat. No. 5,852,587 to Kostek et al. This would serve to broaden the attenuation bandwidth for tool arrivals.

Advantageously, logging tools and methods in accordance with the invention may be effective for a wide frequency band and suitable for downhole environments, especially in relation to temperature insensitivity within the expected operating temperature ranges. Therefore, embodiments of the invention will provide useful attenuators for downhole tools, in particular, logging while drilling and wireline acoustic tools.

As described above, embodiments of the invention provide acoustic logging tools, which incorporate particle damping for attenuating acoustic energy in a broad frequency range as it propagates through a tool body. Embodiments of the invention also provide methods for attenuating acoustic energy in an acoustic logging tool. These tools and methods can be adapted for controlling tool waves and vibrations and reducing shock effects on components of wireline and LWD tools.

While the invention has been described using a limited number of examples, those skilled in the art, having the benefit of this disclosure, will appreciate that other variations are possible without departing from the scope of the invention as disclosed herein. Accordingly, the scope of the invention should be limited only by the claims that follow.

What is claimed is:

1. A logging tool for performing acoustic investigations of subsurface geological formations traversed by a borehole, comprising:

a generally longitudinally extending tool body adapted for positioning in the borehole;

at least one acoustic transmitter mounted on the body;

at least one acoustic receiver mounted on the body at a location axially displaced from the at least one transmitter; and an attenuator positioned along the body, the attenuator comprising at least one cavity having a plurality of particles disposed therein, wherein the attenuator is adapted for motion among the particles disposed therein and between the particles and the walls of said cavity.

2. The logging tool of claim 1, wherein the attenuator is disposed along the acoustical path between the at least one transmitter and the at least one receiver.

3. The logging tool of claim 2, wherein the attenuator comprises a plurality of cavities formed in the tool body.

4. The logging tool of claim 3, wherein the particles comprise a volume of between around 5% and around 20% of a volume of the segment of the tool body between the at least one transmitter and the at least one receiver.

5. The logging tool of claim 3, wherein a volume of the particles is between about 10% and about 15% of a volume of the tool body between the at least one transmitter and the at least one receiver.

6. The logging tool of claim 3, wherein the plurality of cavities comprise holes.

7. The logging tool of claim 6, wherein the holes have a depth of less than the thickness of a wall of the tool body in which the holes are disposed.

8. The logging tool of claim 6, wherein the holes extend though the entire the thickness of a wall of the tool body in which the holes are disposed.

9. The logging tool of claim 6, wherein the holes are arranged in the tool body in a plurality of rows around the circumference of the tool body.

10. The logging tool of claim 9, wherein each row has at least four holes spaced at substantially evenly spaced azimuthal intervals about an axis of the tool.

11. The logging tool of claim 9, wherein the holes on at least one of the rows are azimuthally offset from the holes on an adjacent row.

12. The logging tool of claim 6, further comprising a container disposed inside at least one of the holes, wherein the plurality of particles in the at least one of the holes are disposed inside the container.

13. The logging tool of claim 6, wherein the cavities further comprise at least one groove.

14. The logging tool of claim 13, wherein the holes are disposed on an exterior surface of the tool body and the at least one groove is disposed on an interior surface of the tool body.

15. The logging tool of claim 1, wherein the at least one cavity comprises at least one groove.

16. The logging tool of claim 15, wherein the at least one groove is oriented such that its length is substantially perpendicular to a longitudinal axis of the tool body.

17. The logging tool of claim 15, wherein one of the at least one groove extends substantially all the way around a circumference of one of an interior surface and an exterior surface of the tool body.

18. The logging tool of claim 15, wherein the plurality of particles disposed in the at least one groove are retained in the at least one groove by a sleeve.

19. The logging tool of claim 3, wherein the plurality of cavities comprises a plurality of slots formed in the tool body.

20. The logging tool of claim 19, wherein at least one of the slots is oriented such that its length is substantially parallel to a longitudinal axis of the tool body.

21. The logging tool of claim 19, wherein at least one of the slots is oriented such that its length is substantially perpendicular to a longitudinal axis of the tool body.

22. The logging tool of claim 19, further comprising a container disposed in at least one of the slots, wherein the plurality of particles in the at least one of the slots are disposed in the container.

23. The logging tool of claim 22, wherein the container is retained in the at least one of the slots by a retaining plate.

24. The logging tool of claim 22, wherein the container is welded to a surface in the at least one of the slots.

25. The logging tool of claim 1, wherein the at least one cavity is disposed on an exterior surface of the tool body.

26. The logging tool of claim 1, wherein the at least one cavity is disposed on an interior surface of the tool body.

27. The logging tool of claim 1, wherein the attenuator further comprises a member coupled to the tool body, wherein the at least one cavity having particles therein is disposed within the member.

28. The logging tool of claim 27, wherein the member comprises a hollow ring affixed to an exterior surface of the tool body.

29. The logging tool of claim 27, wherein the member comprises a cylindrical plate disposed between the tool body and one selected from at least one transmitter and at least one receiver mounted on the tool body.

30. The logging tool of claim 27, wherein the member comprises a heavimet insert inserted in a gap on the tool body between the tool body and one selected from at least one transmitter and at least one receiver.

31. The logging tool of claim 1, further comprising a fluid disposed inside the at least one cavity.

32. The logging tool of claim 31, wherein the fluid comprises at least one selected from the group of water, oil, drilling fluid, a fluorocarbon lubricant, a polymer, and a gel.

33. The logging tool of claim 1, wherein the particles comprise a volume of between around 5% and around 20% of a volume of a segment of the tool body along which the attenuator is disposed.

34. The logging tool of claim 33, wherein the volume of the particles is between about 10% and about 15% of the volume of the segment of the tool body.

35. A method for attenuating acoustic energy propagating through a body of an acoustic logging tool, the method comprising:

emitting acoustic energy from a first location on the tool;

acoustically exciting particles disposed in at least one cavity acoustically coupled to the tool body at a location along an acoustical path through the body from the first location of emitting to a second location of receiving, the particles being excitable into motion among said particles and between the particles and the walls of said cavity; and receiving attenuated acoustic energy propagated through the tool body at the second location on the tool axially spaced apart from the first location.

36. The method of claim 35, further comprising acoustically exciting a fluid disposed in the at least one cavity.

37. The method of claim 35, further comprising exciting particles disposed in a plurality of cavities.

38. The method of claim 35, wherein a volume of the particles is between around 5% and around 20% of a volume of a segment of the tool body along which the attenuator is disposed.

39. The method of claim 38, wherein the volume of the particles is between about 10% and about 15% of the volume of the segment of the tool body along which the attenuator is disposed.

40. The method of claim 38, wherein the plurality of particles comprise tungsten powder.

* * * * *